United States Patent [19]
Abe et al.

[11] Patent Number: 5,870,242
[45] Date of Patent: Feb. 9, 1999

[54] DISK APPARATUS AND METHOD OF MEASURING FREQUENCY CHARACTERISTIC THEREOF

[75] Inventors: Yukio Abe, Higashine; Koji Ikenoya; Takehiko Tsuboi, both of Kawasaki, all of Japan

[73] Assignee: Fujitsu Limited, Kawasaki, Japan

[21] Appl. No.: 715,046

[22] Filed: Sep. 17, 1996

[30] Foreign Application Priority Data

Dec. 26, 1995 [JP] Japan .................................. 7-338614

[51] Int. Cl.$^6$ ....................................................... G11B 5/596
[52] U.S. Cl. .................................. 360/77.08; 360/78.09; 360/75
[58] Field of Search ............................ 360/72.08, 77.11, 360/78.01, 78.04, 78.05, 78.09, 78.14, 77.02, 77.01, 75, 69; 369/44.27, 44.28, 44.32, 44.34

[56] References Cited

U.S. PATENT DOCUMENTS 5,602,810  2/1997  Horimai et al. ..................... 369/44.34

FOREIGN PATENT DOCUMENTS

60-7664   1/1985  Japan .
62-204476 9/1987  Japan .

*Primary Examiner*—Muhammad N. Edun
*Attorney, Agent, or Firm*—Greer, Burns & Crain, Ltd

[57] ABSTRACT

Servo information is written on a magnetic disk at intervals equivalent to 1/N of where the period at the position of a head is controlled. When the frequency characteristic of a servo loop is measured, a servo controller generates a position signal, which indicates deviation of the head from a reference position, using servo information at a first sampling point, calculates an actuator drive current command value, which drives an actuator, on the basis of the position signal, and controls the actuator based upon the current command value. Further, the servo controller executes processing for generating the position signal, but does not calculate the actuator drive current command value, on the basis of servo information at second through Nth sampling points. A frequency characteristic analyzer inserts a disturbance signal having a predetermined frequency into the servo loop, accepts, at double the sampling frequency, the position signal and the actuator drive current generated based upon each item of servo information, obtains the frequency characteristic of the servo loop and outputs the frequency characteristic.

8 Claims, 13 Drawing Sheets

DISK APPARATUS AND METHOD OF MEASURING FREQUENCY CHARACTERISTIC THEREOF

BACKGROUND OF THE INVENTION

This invention relates to a disk apparatus and a method of measuring the frequency characteristic thereof. More particularly, the invention relates to a disk apparatus and a method of measuring the frequency characteristic thereof, wherein the disk apparatus has a disk provided with servo areas and data areas, and a servo loop for moving a head to a target position or positioning the head at the target position by controlling an actuator using servo information that has been recorded in the servo areas.

Figure 7:
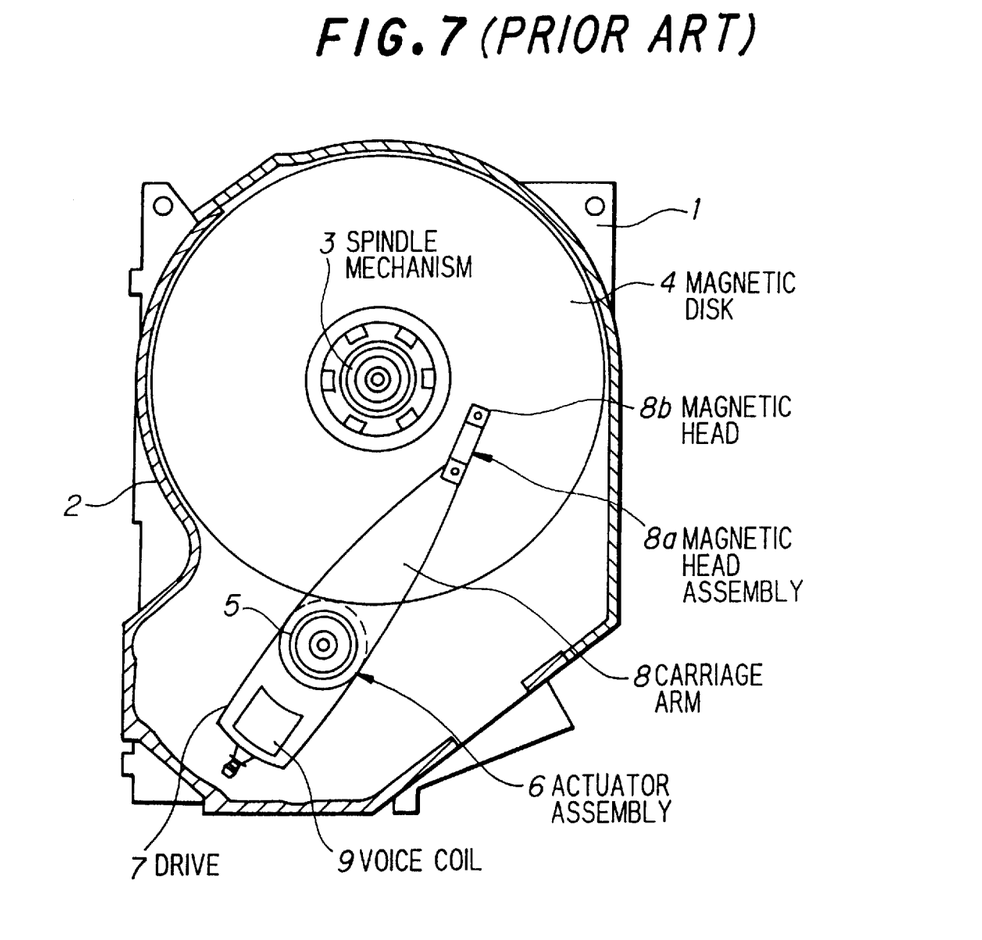
FIG. 7 is a diagram illustrating the construction of a magnetic disk apparatus.

In a magnetic disk apparatus, data read/write is carried out by positioning a magnetic head at a predetermined position on a disk. FIG. 7 illustrates the construction of such a magnetic disk apparatus, which includes a cover 1, a base 2 and a spindle mechanism 3. A prescribed number of magnetic disks 4 serving as recording media are mounted on the spindle mechanism 3 at a prescribed spacing in juxtaposed fashion. An actuator assembly 6 adapted so as to be turned freely by a rotary shaft 5 is provided in the proximity of the magnetic disks 4. The actuator assembly 6 comprises a drive unit (actuator) 7 on one side of the rotary shaft 5 and carriage arms 8 on the other side of the rotary shaft 5. The actuator 7 is provided with a voice coil 9 constituting a voice coil motor. The number of carriage arms 8 corresponds to the number of magnetic disks 4. A magnetic head assembly 8$a$ is mounted on one or both sides of the distal end of each carriage arm 8 and is so adapted that a magnetic head 8$b$ is positioned at a prescribed position of the magnetic disk 4 in the radial direction thereof.

Figure 8:
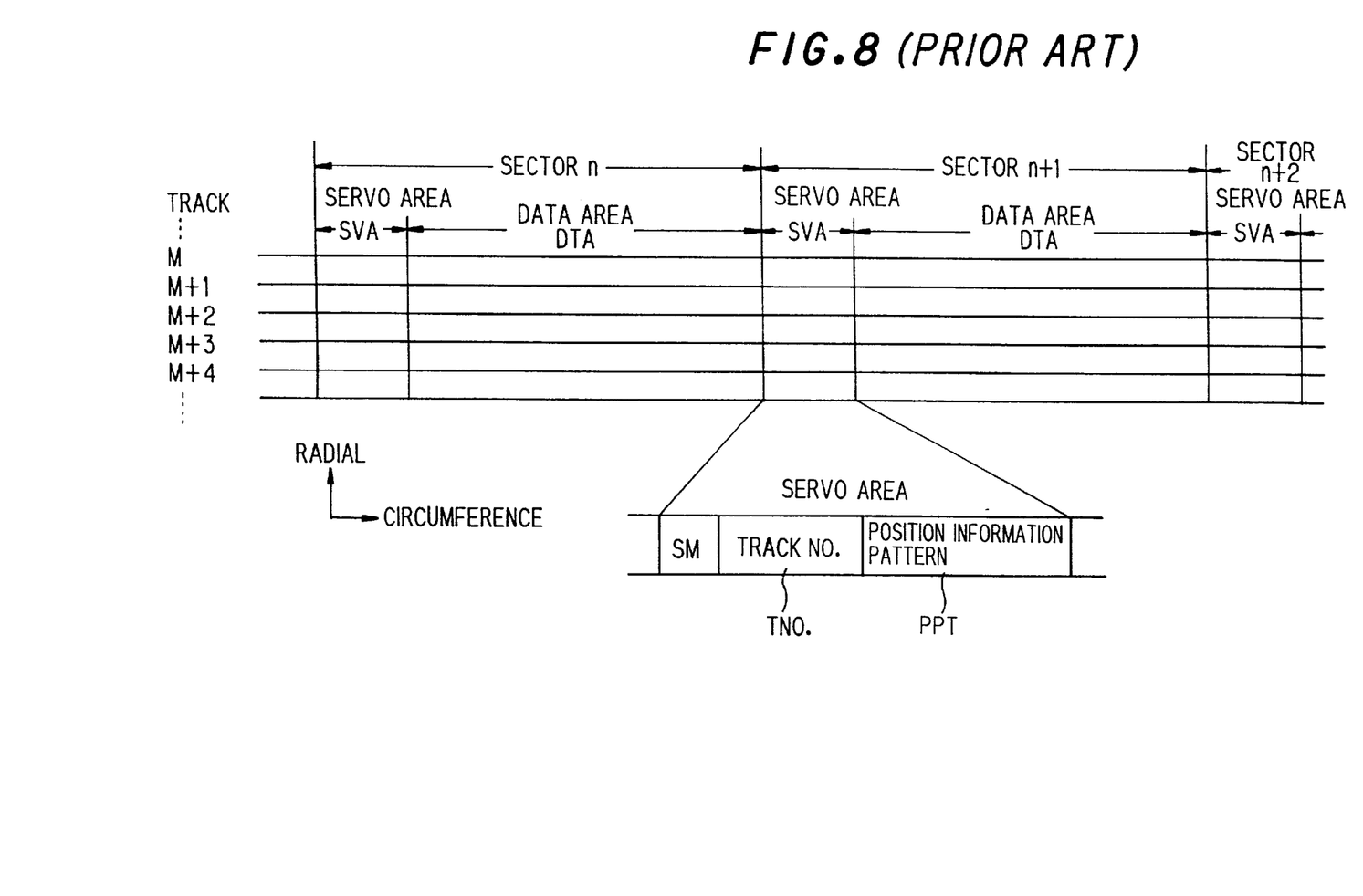
FIG. 8 is a diagram showing the constitution of sectors.

A plurality of tracks are formed on the disk surface of the magnetic disk 4 in a sector servo system which may be referred to as data-surface servo system, and each track is divided into a plurality of sectors. Each sector has a sector servo area SVA and a data area DTA, as shown in FIG. 8. Servo information, including a sector mark (servo mark) SM, a track number TNO, and a position information pattern PPT, is recorded in the servo area SVA.

Figure 9:
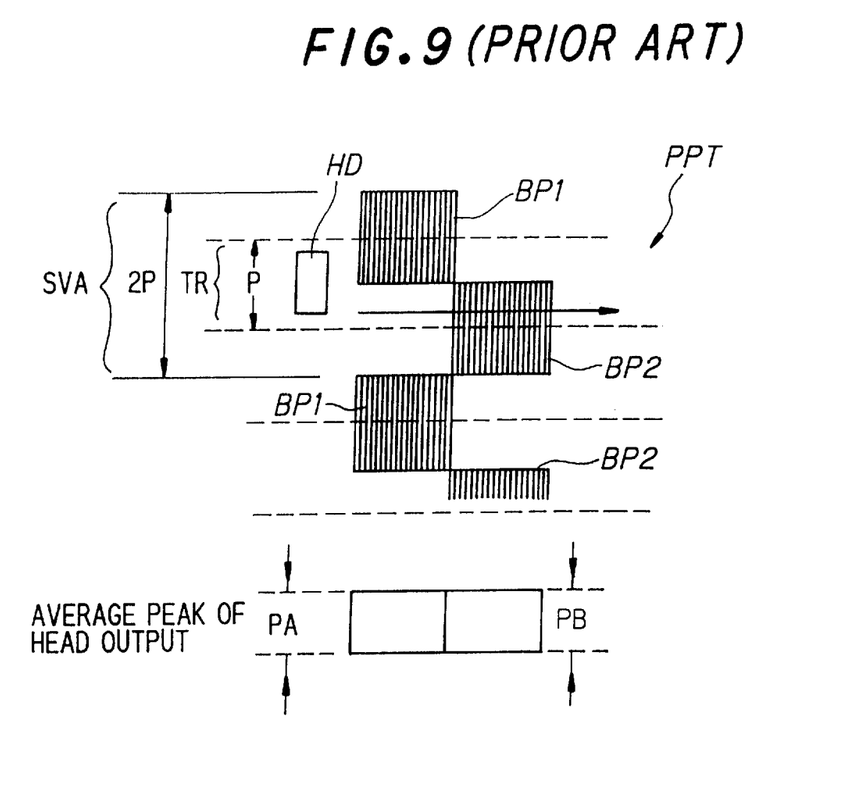
FIG. 9 is a diagram for describing a position information pattern and servo output signal according to the prior art.

As shown in FIG. 9, the position information pattern PPT is formed by recording zigzag burst patterns BP1, BP2, which have predetermined recording frequencies, at a fixed spacing (equal to track width P, for example) in the radial direction. A track TR is formed to have the width P in the middle of the width 2P of the servo area SVA radially thereof. The reason for this is that the relationship between head output when the burst patterns PB1, PB2 are read and the offset from the center of the track is not linear outside the area of width P. This means that accurate tracking and data read/write cannot be performed outside the area of width P.

In accordance with the above-described position information pattern, peak values PA, PB of the head output read from the burst patterns PB1, PB2 become equal when a head HD is situated in the center of the track. The difference between the peak values becomes larger as the head deviates from the center of the track. Accordingly, (PA−PB) can be adopted as a position signal or position deviation signal of the head relative to the center of the track. If a tracking servo loop is constructed in such a manner that the position deviation signal (PA−PB) becomes zero, the head can be positioned at the center of the track at all times, thereby making it possible to perform the reading and writing of data accurately.

In a magnetic disk apparatus, the head is positioned from the position of a current track to the position of a target track. In such head positioning control, first a command velocity conforming to the number of tracks up to the target track is generated and velocity control is performed in such a manner that actual velocity will coincide with the command velocity. When the head arrives at the target track, control is changed over from velocity control to position control and the head is controlled so as to be positioned at the center of the target track in such a manner that the position deviation signal becomes zero. Actual velocity Va of the head required in this case is obtained through calculation. Specifically, the actual velocity of the head is calculated in accordance with the following equation:

$$Va=\{[TN(n)+PES(n)]-[TN(n+1)+PES(n+1)]\}/Ts \quad (1)$$

where PES(n) represents the position deviation signal (PA−PB) in the current sector (n), TN(n) the track number in the current sector (n), PES(n+1) the position deviation signal (PA−PB) in the next sector (n+1), TN(n+1) the track number in the next sector (n+1), and Ts the period (sector period) for movement of the head from the current sector (n) to the next sector (n+1).

Figure 10:
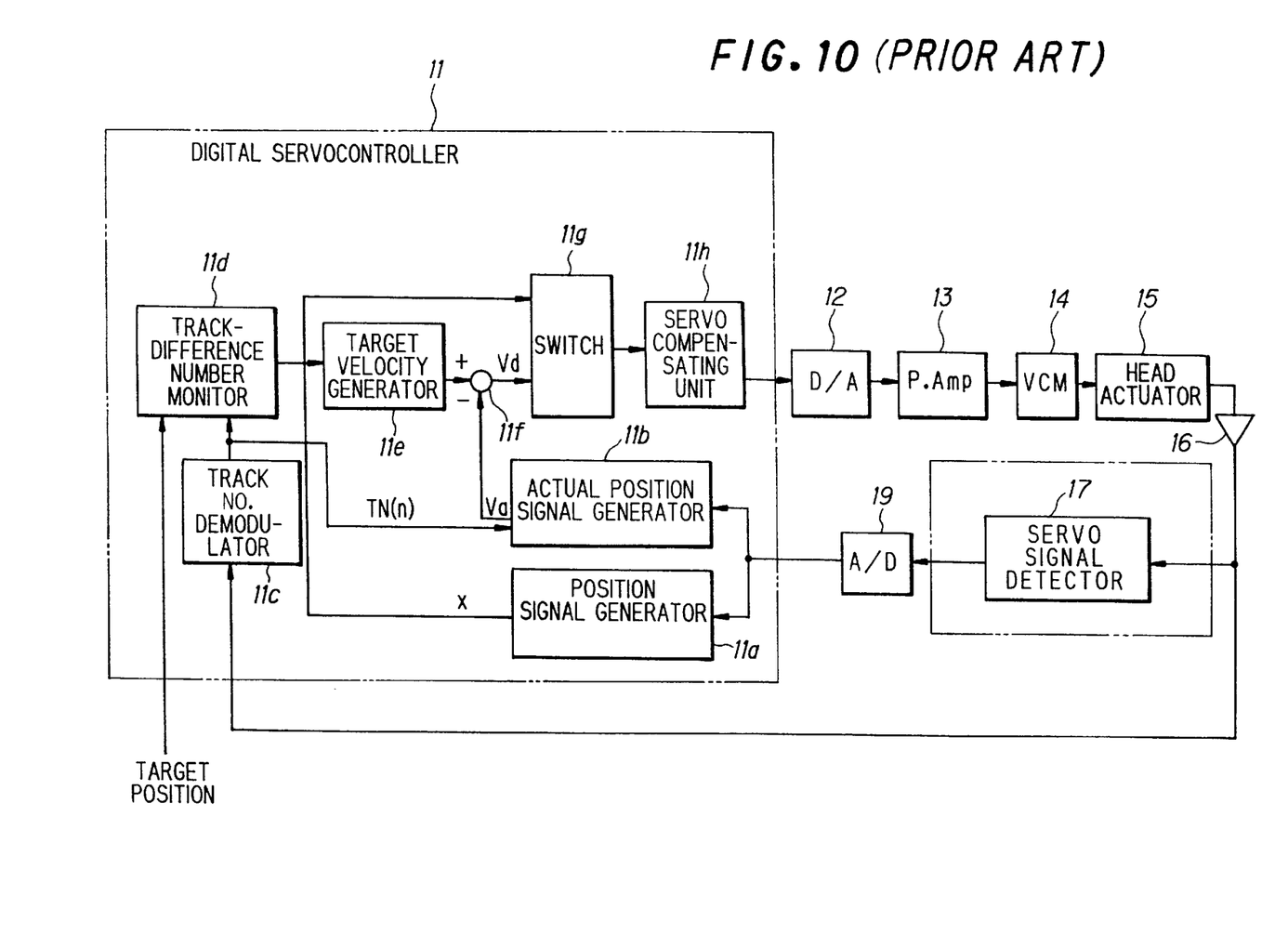
FIG. 10 is a block diagram illustrating a servo configuration in a sector servo scheme.

FIG. 10 is a block diagram illustrating the architecture of a head positioning system in a sector servo system.

As shown in FIG. 10, the system includes a digital servo controller 11, a DA converter 12 for converting a digital servo signal outputted by the servo controller 11 to an analog signal, a power amplifier 13, a voice coil motor (VCM) 14 for moving the head in the radial direction, a head actuator 15, a head (HD) 16, a servo signal detector 17 and an AD converter 19 for converting an integrated output (the output of the servo signal detector 17) to a digital value at a predetermined sampling timing.

The digital servo controller 11 includes a position signal generator 11$a$ for outputting a head position signal x based upon (PA−PB), where PA, PB represent integrated values of signals obtained by reading and demodulating first and second position information pattern signals PB1 and PB2, respectively.

The digital servo controller 11 further includes an actual-velocity signal generator 11$b$ for calculating the actual velocity Va of the head in the radial direction based upon Equation (1); a track number demodulator 11$c$ for demodulating the track number, which has been written in a servo area, from the head output; a track-difference number monitor 11$d$ for monitoring the number of tracks between the current head position (track number) and the target track; a target velocity generator 11$e$ for outputting a predetermined command velocity (target velocity) based upon the number of tracks from the current head position to the target track position; an arithmetic unit 11$f$ for outputting a difference signal Vd representing the difference between the target velocity and actual velocity; a switch 11$g$; and a servo compensating unit 11$h$ for outputting a current command value upon calculating the value on the basis of a signal obtained from the switch 11$g$. The switch 11$g$ delivers the velocity difference signal Vd, which is outputted by the arithmetic unit 11$f$, until the head arrives at the target track, and delivers the position signal x, which is outputted by the position signal generator 11$a$, when the head is at the target track. The digital servo controller 11 can be constructed from a digital signal processor (DSP), a microprocessor unit (MPU), etc.

When a signal representing a target position enters the digital servo controller 11, the track-difference number monitor 11$d$ calculates the number of tracks to the target track and the target velocity generator 11$e$ generates the target velocity based upon the number of tracks. The switch 11$g$ selectively outputs the velocity difference signal Vd, and the servo compensating unit 11$h$ outputs the command current value upon calculating the value using the output from the switch 11$g$. The current command value is converted from a digital value to an analog value and the analog value is power-amplified, after which the amplified signal enters the voice coil motor 14. As a result, the voice coil motor 14 starts rotating and the head is moved toward the target track at the commanded velocity.

When the head 15 is moving, the position information pattern signals BP1, BP2 that have been recorded in the servo area are read and outputted. The signals obtained by reading the position information pattern signals BP1, BP2 are integrated by the servo signal detector 17, after which the signals representing the integrated values PA, PB are converted from analog to digital signals by the AD converter 19. The digital signals enter the digital servo controller 11.

The position signal generator 11a generates (PA−PB) as the position signal x, the actual-velocity signal generator 11b generates the actual velocity signal Va by performing the computation of Equation (1), and the arithmetic unit 11f outputs the velocity difference signal Vd, which represents the difference between the target velocity and the actual velocity. The switch 11g selects the velocity difference signal Vd and the servo compensating unit 11h generates and outputs the current command value using the velocity difference signal Vd. This operation is subsequently repeated to make the head approach the target track.

When the head arrives at the target track, the switch 11g effects a changeover from velocity control to position control and selectively outputs the position signal x produced by the position signal generator 11a. The servo compensating unit 11h outputs the current command value upon calculating this value using the signal x. By virtue of this operation, positioning control is carried out based upon the position signal x until the head is finally positioned at the target position on the target track.

Figure 11:
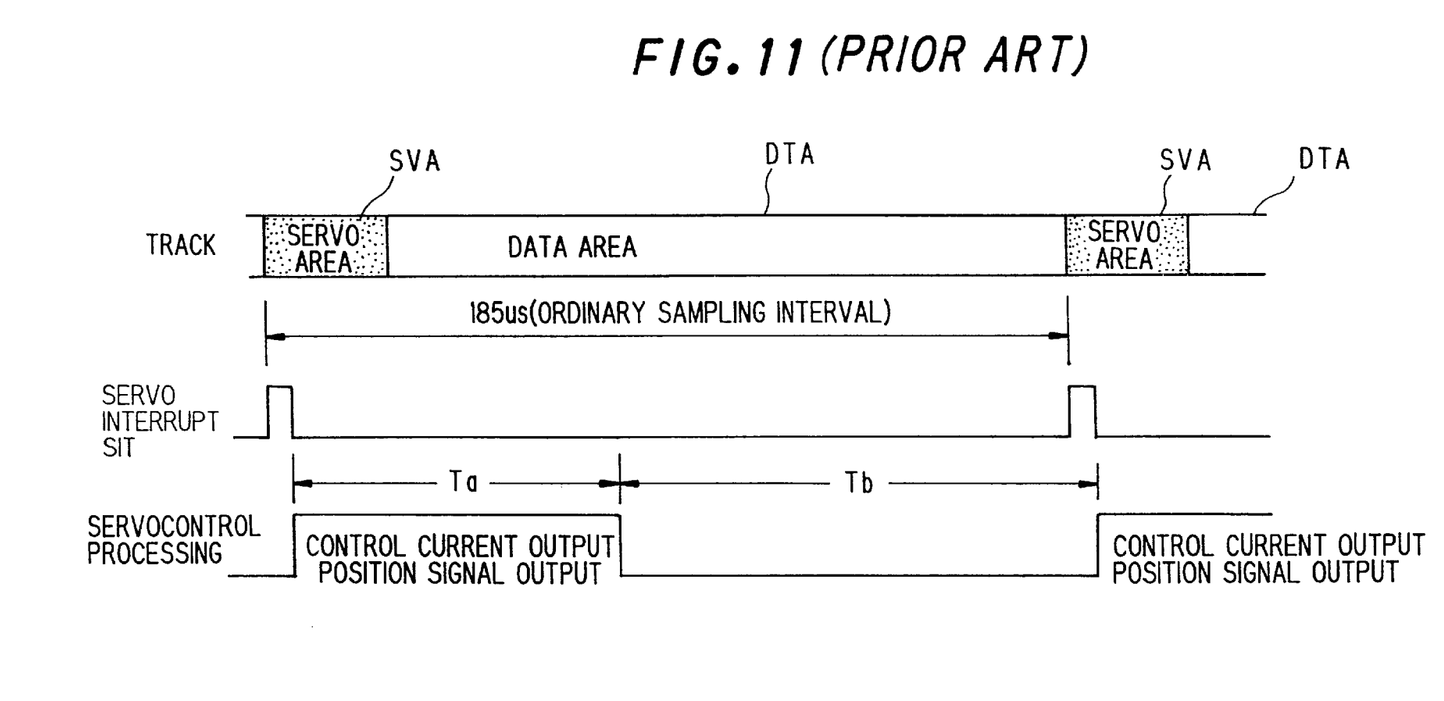
FIG. 11 is a timing chart in association with servo control according to the prior art.

The foregoing operation has been described just as if velocity control and position control were performed in a continuous fashion. However, with a digital servo, the above-mentioned control is performed discretely. FIG. 11 is a control timing chart associated with the digital servo. A servo interrupt SIT is generated at intervals of 185 µs by detecting the sector mark that has been recorded in the servo area SVA. When the servo interrupt SIT is generated, the digital servo controller 11 comprising the DSP or MPU generates and outputs the position signal x and calculates and outputs the control current (command current) in the interval Ta and drives the actuator of the voice coil motor and the like by the control current in the interval Tb, thereby executing servo control (velocity control and position control).

Figure 12:
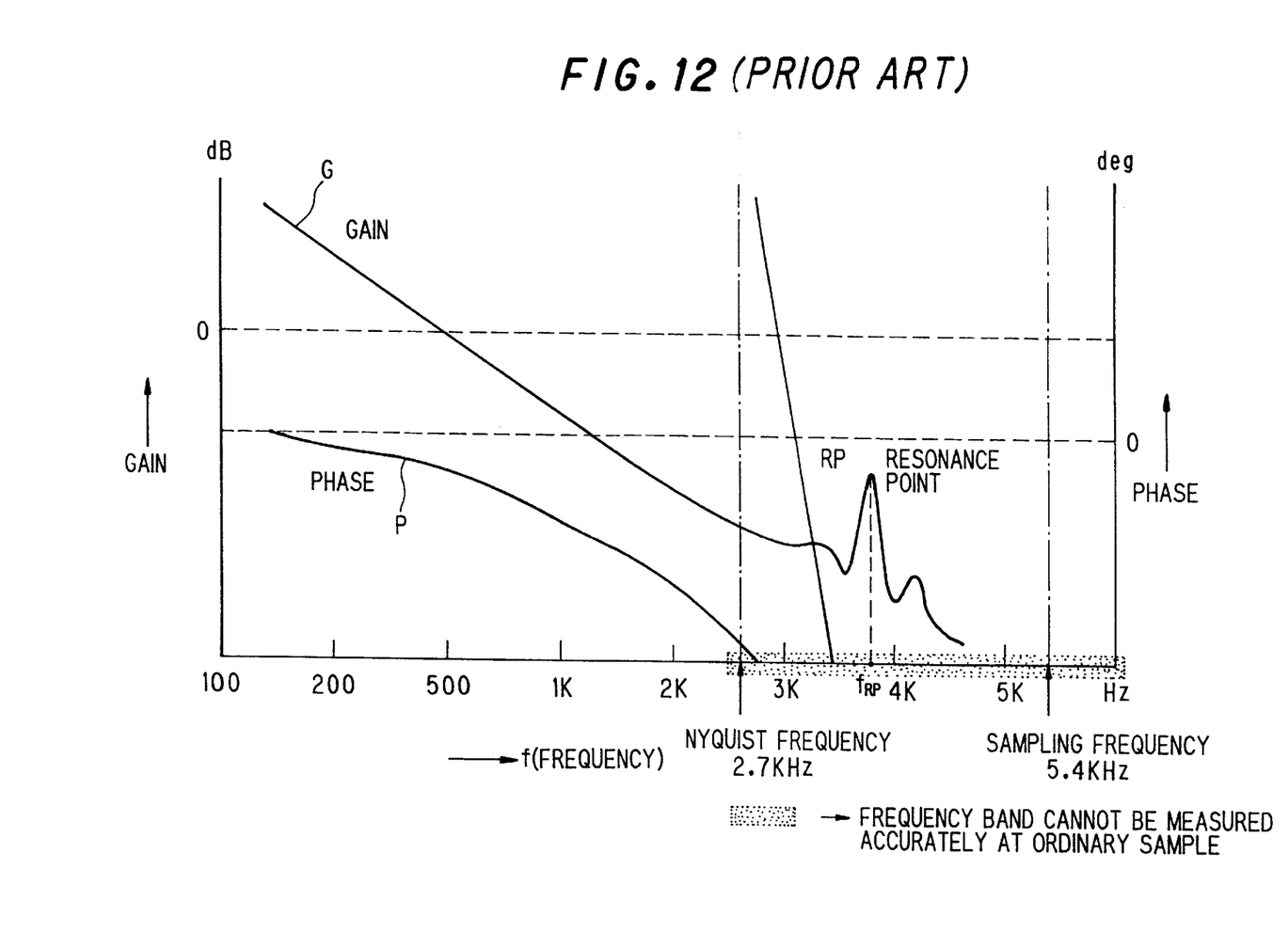
FIG. 12 shows the frequency characteristic of a magnetic disk apparatus.

A disk control apparatus has a mechanical resonance point RP, as illustrated in FIG. 12. In the graph of FIG. 12, frequency is plotted along the horizontal axis and both gain [=(position x)/(actual drive current i)] and phase are plotted along the vertical axis, where G represents the gain characteristic and P the phase characteristic. Further, fs (=5.4 kHz=$10^6$/185) represents the sampling frequency of the servo information and $f_N$ (=2.7 kHz) the Nyquist frequency. When the mechanical resonance point RP is present, there are cases where the actuator is caused to oscillate at a resonance frequency $f_{RP}$ by an external force or the like, as a result of which servo control can no longer be carried out. For this reason, the resonance frequency $f_{RP}$ and resonance level of the mechanical resonance point are measured when the magnetic disk apparatus is designed and measurement must be taken to shift the resonance frequency or to lower the resonance level.

Figure 13:
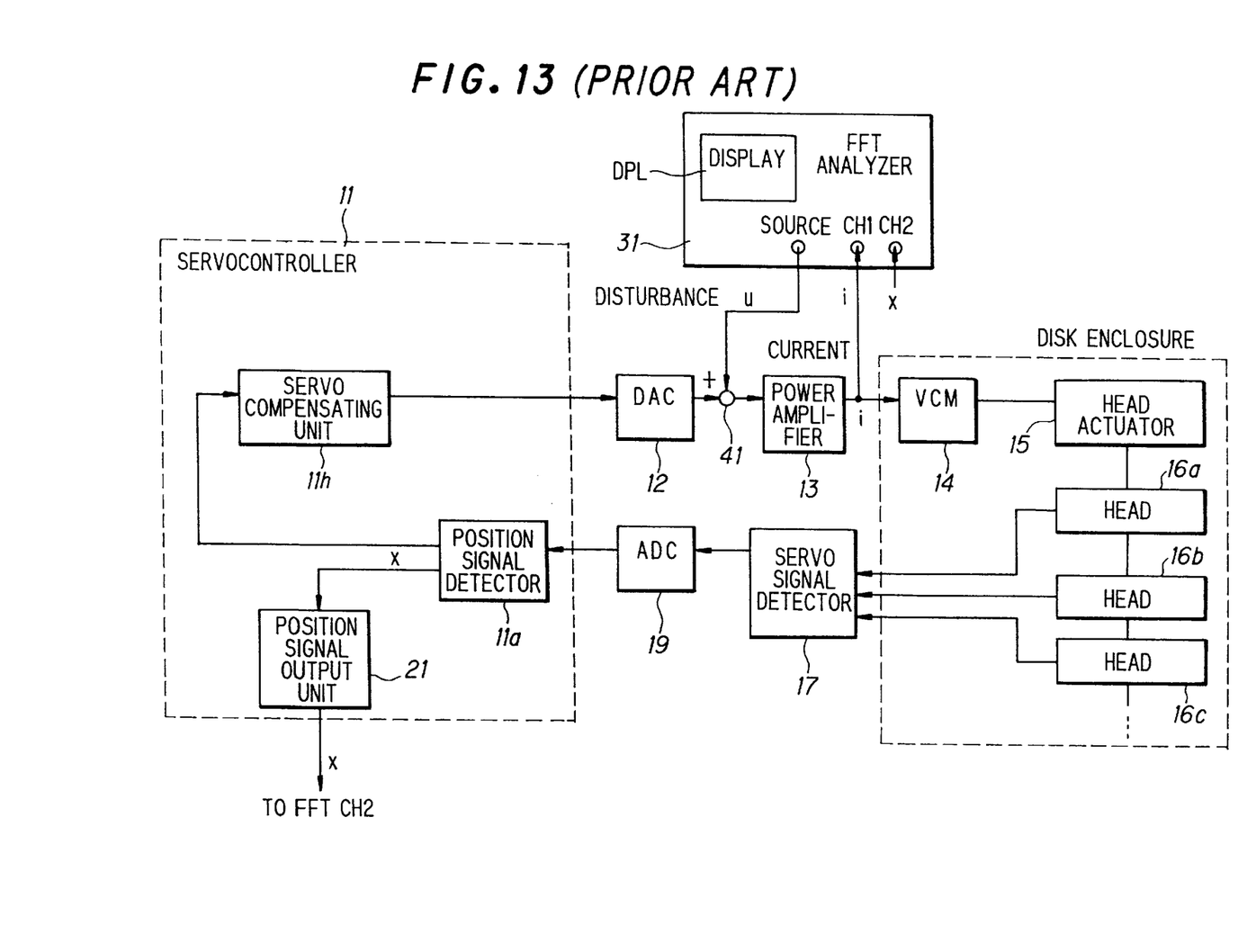
FIG. 13 is a block diagram illustrating a system for measuring the position control characteristic of a disk driver according to the prior art.

FIG. 13 is a block diagram illustrating a conventional measurement system for measuring the position control characteristic of a disk driver. Components identical with those shown in FIG. 10 are designated by like reference characters. In addition, only the essential portions of the digital servo controller 11 are shown. The system includes a position signal output unit 21 for outputting the position signal x detected by the position signal detector 11a, and an FFT analyzer 31 for generating a disturbance u having a predetermined frequency f and analyzing the frequency characteristic of the servo loop by accepting the actuator drive current i and the position signal x. The FFT analyzer 31 obtains the frequency characteristic of the servo loop by varying the disturbance frequency, displays the characteristic on a display screen DPL and produces a printout as necessary. An example of the FFT analyzer is the HP3563A, manufactured by Hewlett-Packard. The system further includes a synthesizer 41 which introduces the disturbance u into the servo loop. More specifically, the synthesizer 41 mixes the output signal of the DA converter 12 with the disturbance u and enters the resulting signal into the power amplifier 13.

The shorter the interval between the servo areas SVA (see FIG. 11), the larger the number of times servo control is performed and the more accurate velocity/position control can be carried out. However, when the intervals of between the servo areas are shortened, it is required that velocity/position control be performed at high speed, and situations can arise in which the velocity/position control calculations cannot keep pace. In addition, the data areas become narrower. Accordingly, in the prior art, the intervals the servo areas, i.e., the sampling period of the servo information, are made 185 µs, as illustrated in FIG. 11. The interval of 185 µs corresponds to a frequency of 5.4 kHz. The FFT analyzer 13 of FIG. 13 is capable of measuring the frequency characteristic accurately up to the Nyquist frequency of 2.7 kHz. However, as shown in FIG. 12, the mechanical resonance point usually has a frequency higher than the Nyquist frequency of 2.7 kHz, as depicted in FIG. 12. As a consequence, a problem encountered in the prior art is that the frequency characteristic (mechanical resonance frequency and resonance level, etc.) cannot be measured accurately in the vicinity of the resonance point.

SUMMARY OF THE INVENTION

Accordingly, an object of the present invention is to provide a disk apparatus in which the frequency characteristic (mechanical resonance frequency, resonance level, etc.) in the vicinity of the mechanical resonance point can be measured accurately, as well as a method of measuring the frequency characteristic of the disk apparatus.

According to the present invention, the foregoing object is attained by providing a disk apparatus, which has a disk provided with a servo area and a data area, for moving a head to a target position or for positioning the head at the target position by controlling an actuator using servo information that has been recorded in the servo area, wherein servo information recorded on the disk is first servo information recorded in the servo area and is used in controlling position of the head and second servo information is used to measure the frequency characteristic of a servo loop in the disk apparatus.

Further, according to the present invention, the foregoing object is attained by providing a disk apparatus, which has a disk provided with a servo area and a data area, for moving a head to a target position or for positioning the head at the target position by controlling an actuator using servo information that has been recorded in the servo area, wherein the servo information is written on a track so as to be sampled at a period which is 1/N (where N is an integer of two or greater) of the period at which the position of the head is controlled.

According to the present invention, the foregoing object is attained by providing a method of measuring the frequency characteristic of a servo loop in a disk apparatus for moving a head to a target position or for positioning the head at the target position by controlling an actuator using servo information that has been recorded in a servo area of a disk having the servo area and a data area, comprising the steps of connecting a frequency characteristic analyzer, which is for measuring the frequency characteristic of the servo loop, to the disk apparatus; writing the servo information on a track so as to be sampled at a period which is 1/N (where N is an integer of two or greater) of the period at which the position of the head is controlled; in a servo controller of the disk apparatus, generating a position signal, which indicates deviation of the head from center of a track, using servo information at a first sampling point from among N items of servo information within the period at which the position of the head is controlled, calculating an actuator drive current command value, which drives the actuator, on the basis of the position signal, controlling the actuator based upon the actuator drive current command value and executing position-signal generation processing for measuring the frequency characteristic of the servo loop using the servo information at second through Nth sampling points; inserting a disturbance signal having a predetermined frequency into the servo loop from the frequency characteristic analyzer when the frequency characteristic of the servo loop is measured; and, in the frequency characteristic analyzer, accepting, at the sampling period which is 1/N of the period at which the position of the head is controlled, the position signal and the actuator drive current generated based upon each item of servo information, and obtaining the frequency characteristic of the servo loop using the accepted position signal and the actuator drive current.

Other features and advantages of the present invention will be apparent from the following description taken in conjunction with the accompanying drawings.

DESCRIPTION OF THE PREFERRED EMBODIMENTS (A) Overview of the invention

Figure 1:
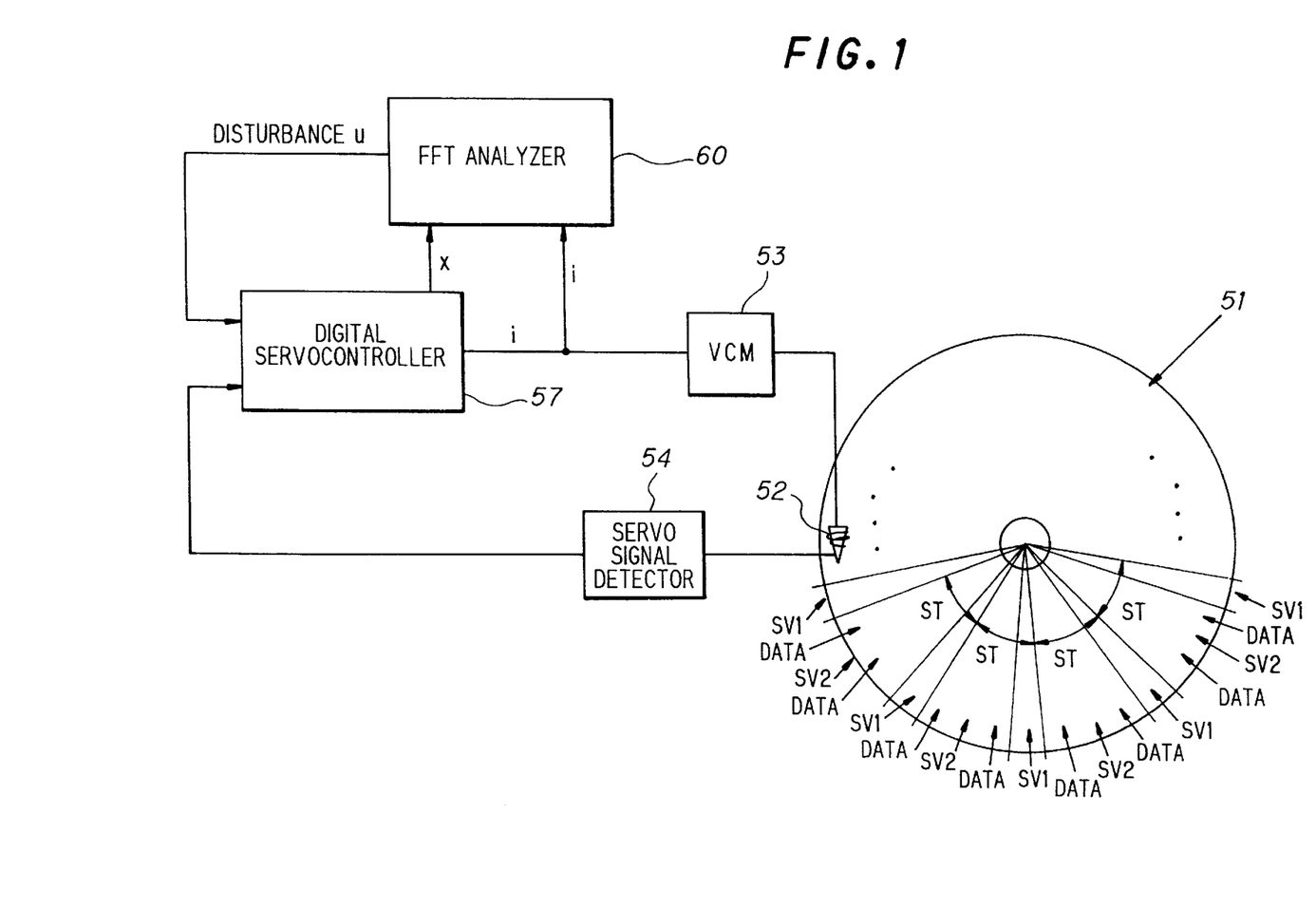
FIG. 1 is a diagram for describing an overview of the present invention.

FIG. 1 is a diagram for describing an overview of the present invention. FIG. 1 illustrates a magnetic disk 51 having a servo area and a data area for each sector ST, a magnetic head 52, a voice coil motor 53 for moving the magnetic head 52 in the radial direction, a servo signal detector 54, a digital servo controller 57 comprising a DSP or MPU, and an FFT analyzer 60 for measuring the frequency characteristic of a servo loop.

Servo information SV1~SVN (where N is an integer of two or greater; e.g., N =2 in this embodiment) is written on the magnetic disk 51 at intervals of 1/N of the position control period when data are read and written. At data write/read, servo control is performed by reading only the servo information SV1 at the sampling period T1. However, each item of servo information SV1~SVN is read at a sampling period $T_2$ ($=T_1/N$) when the frequency characteristic of a digital servo loop is measured. More specifically, the servo controller 57 generates a position signal from a reference position on the basis of the servo information SV1 in the first sampling, calculates a current command value which drives an actuator (the voice coil motor 53) on the basis of this position signal, executes processing for controlling the actuator based upon the current command value and executes processing only for generating the position signal on the basis of the servo information SV2~SVN in the second through Nth samplings. The FFT analyzer 60 inserts a disturbance signal u having a predetermined frequency into the digital servo loop, accepts, at a sampling frequency increased by the factor N (i.e., at the sampling period $T_2$) a position signal x generated based upon each item of servo information of sampling period $T_2$ ($=T1/_N$) and actuator drive current i, obtains the frequency characteristic of the digital servo loop and outputs this frequency characteristic.

Thus, as set forth above, it is so arranged that the servo information SV2~SVN is written to the magnetic disk at the sampling period $T_2$ ($=T_1/N$), which is 1/N of the sampling period $T_1$ (the position control period at the time of data read/write) of the servo information SV1 used in servo control when data are read/written. Accordingly, if N=2 holds, for example, the Nyquist frequency is 5.7 kHz and a frequency characteristic up to this Nyquist frequency of 5.7 kHz can be measured accurately. This makes it possible to accurately measure the frequency characteristic (mechanical resonance frequency $f_{RP}$ and resonance level, etc.) in the vicinity of the resonance point (see FIG. 12). This has not been possible heretofore. Shifting of the resonance-point frequency $f_{RP}$ and adjustment of the resonance-point level can be performed easily and accurately.

Further, the servo information is written at the period $T_2$ ($=T_1/N$), which is 1/N of the sampling period $T_1$ in the data zone, only in an area (e.g., the outermost track) outside the data zone of the magnetic disk. When the frequency characteristic is measured, the head is positioned at the outermost track to measure the frequency characteristic. If this arrangement is adopted, the data area is not narrowed even if the servo information is written at the sampling frequency multiplied by N (i.e., at the sampling period of 1/N).

(B) Method of recording servo information

Figure 2:
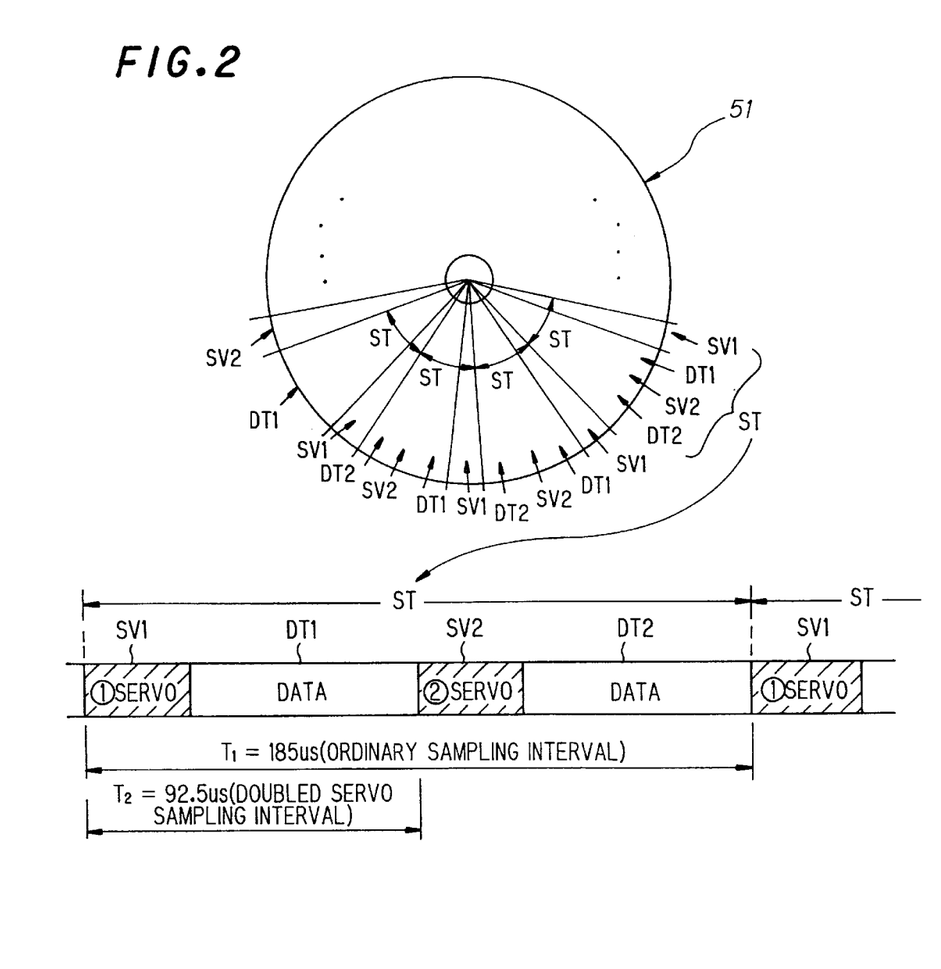
FIG. 2 is a diagram for describing a method of recording servo information.

FIG. 2 is a diagram for describing the method of recording the servo information. It should be noted that the position control period at the time of data read/write, or in other words, the sampling period T1 of the servo information SV1 used for servo control at the time of data read/write, shall be referred to as the ordinary sampling period.

The servo information SV1~SVN is written on the tracks of the magnetic disk 51 at the sampling period $T_2$ (=$T_1$/N= 92.5 $\mu$) which is 1/N (where N is an integer of two or greater; e.g., N=2 in this embodiment) of the ordinary sampling period $T_1$. More specifically, first servo information SV1 used at the time of data read/write is recorded at the beginning of each sector ST, second servo information SV2 is recorded anew in the middle of the sector ST, and the sampling period $T_2$ is made one-half of the ordinary sampling period $T_1$. Data DT1, DT2 are recorded between the items of servo information SV1 and SV2.

(C) Apparatus for measuring frequency characteristic

Figure 3:
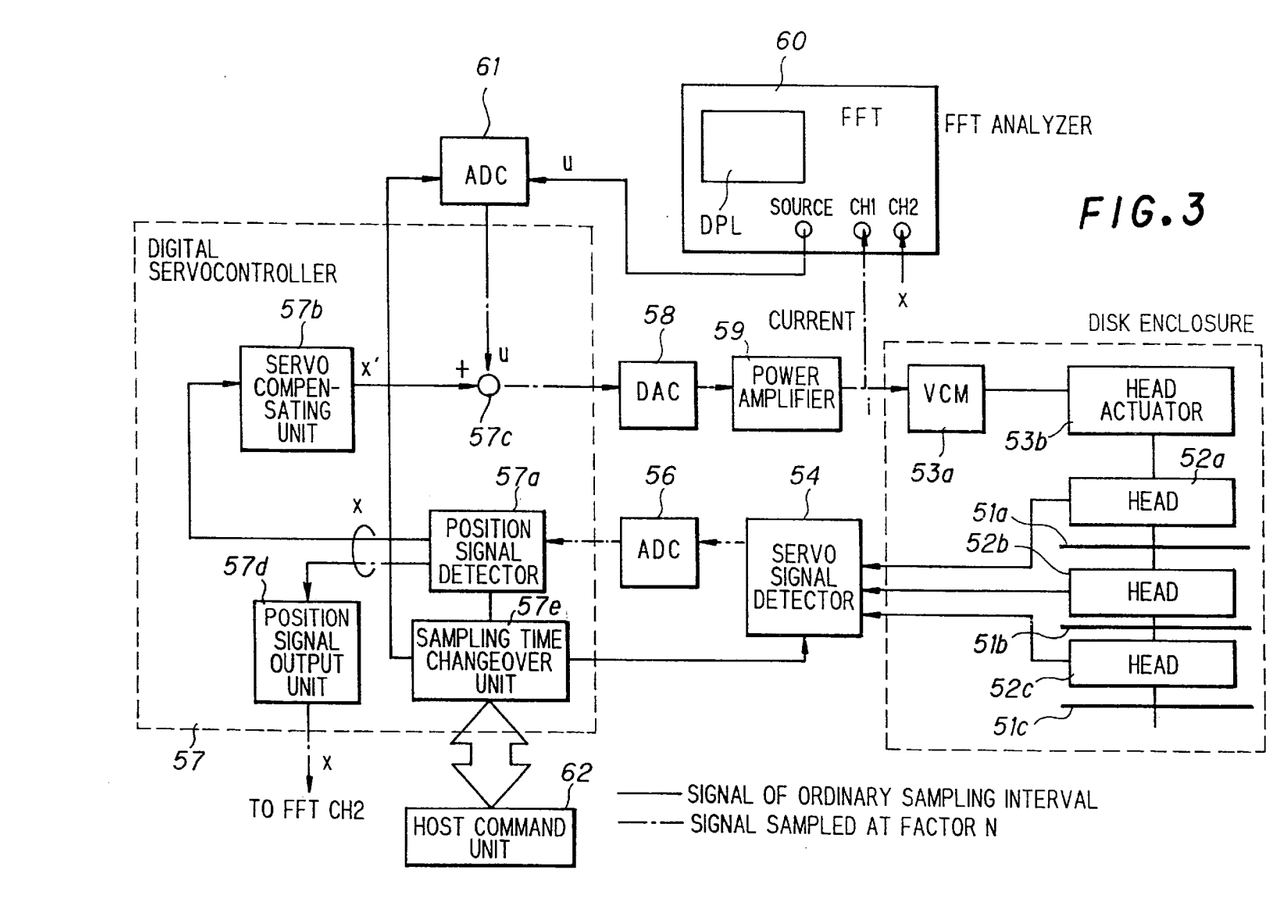
FIG. 3 is a block diagram illustrating the architecture of a frequency measuring apparatus according to the present invention.

FIG. 3 is a block diagram illustrating the apparatus for measuring the frequency characteristic according to the present invention. The apparatus includes magnetic disks 51a~51c on each of which the position information SV1, SV2 is recorded at the sampling period $T_2$, which is one-half of the ordinary sampling period $T_1$, as shown in FIG. 2. The apparatus further includes magnetic heads 52a~52c, a voice coil motor 53a, a head actuator 53b and the servo signal detector 54. The servo signal detector 54 outputs a signal (servo signal SV1) produced by a head at the sampling period $T_1$ (=185 $\mu$s) at the time of data read/write. In a frequency measurement mode (doubled sampling mode), however, the servo signal detector 54 outputs signals (servo signals SV1~SVN) produced by a head at the sampling period $T_2$ (=$T_1$/N) which is 1/N of the sampling period $T_1$ at the time of data read/write. The apparatus further includes an AD converter 56 that converts the analog output signal from the servo signal detector 54 to a digital value, the digital servo controller 57 comprising a DSP or MPU, a DA converter 58 for converting the current command value outputted by the servo controller to an analog signal, a power amplifier 59, the FFT analyzer 60 for measuring the frequency characteristic of the servo loop, an AD converter 61 for converting the disturbance u outputted by the FFT analyzer 60 to digital data at a rate which is N (=2) times the ordinary sampling frequency, and a host 62.

In a manner similar to that of the digital servo controller 11 of FIG. 10, the digital servo controller 57 detects the position signal x and actual velocity Va, calculates the current command value which drives the actuator and outputs the current command value. FIG. 3 illustrates only the portions relating to position control and frequency measurement control performed after the head has been positioned on a target track. The digital servo controller 57 includes a position signal detector 57a which, at the time of data read/write, outputs the position signal x, which conforms to the position deviation of the head from the reference position (track center), at the sampling period $T_1$. In the frequency measurement mode (the doubled sampling mode), the position signal detector 57a detects the position signal x and outputs the same at the sampling period $T_2$ (=$T_1$/2). A servo compensating unit 57b outputs a control current value (actuator drive current) on the basis of the position signal x and outputs the control current value. A synthesizer 57c mixes the control current and the disturbance signal u and outputs the result. A position signal output unit 57d outputs the position signal x to the FFT analyzer 60. When the frequency characteristic is measured, a sampling-time changeover unit 57e makes the sampling period $T_2$ equal to 1/N (N =2) of the sampling period $T_1$ at the time of data read/write. The changeover of the sampling period is commanded by the host 62 at the time of frequency measurement.

(D) Timing chart of servo control and position output

Figure 4:
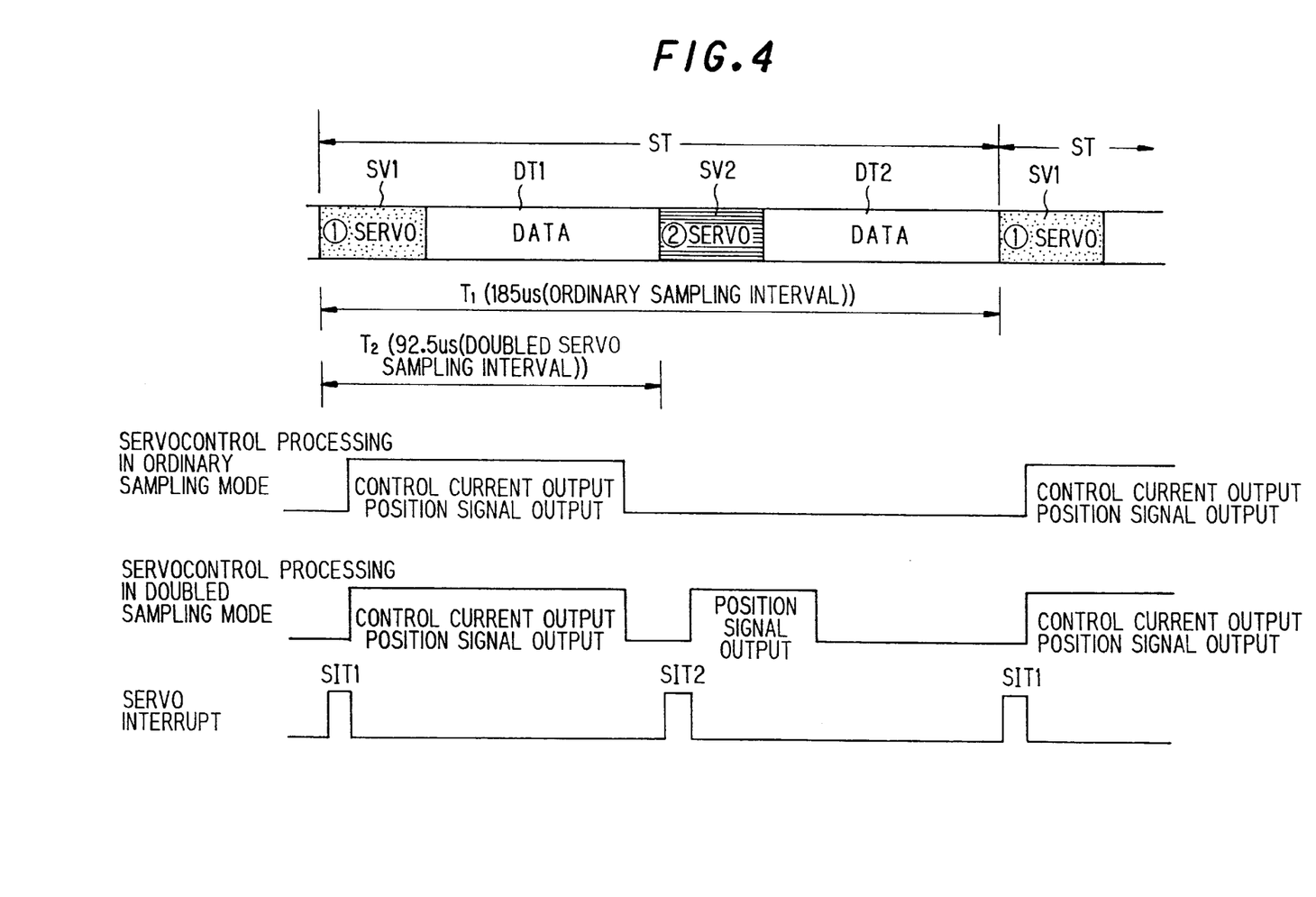
FIG. 4 is a timing chart illustrating servo control and position signal outputs according to the present invention.

FIG. 4 is a timing chart showing the operation of the digital servo controller 57 at the time of data read/write (the ordinary sampling mode) and at the time of frequency characteristic measurement (the doubled sampling mode) in a case where N =2.

At data read/write, the sampling frequency (sampling period) is the ordinary frequency $f_1$ ($T_1$) and a servo interrupt SIT1 is generated by reading only the servo mark of the first servo area SV1 at the beginning of the sector. When the servo interrupt SIT1 is generated, the digital servo controller 57 detects and outputs the position signal, calculates the control current and outputs the same, thereby driving the actuator in such a manner that the head is situated at the center of the track. Thereafter, the digital servo controller 57 continues with the above-mentioned position control whenever the servo interrupt SIT1 is generated.

At frequency characteristic measurement (in the doubled sampling mode), on the other hand, the sampling frequency (sampling period) becomes twice the ordinary, namely 2·f ($T_2$=$T_1$/2), and servo interrupts SIT1, SIT2 are generated by reading the servo marks of the first servo area SV1 at the beginning of the sector and the second servo area in the middle of the sector. Further, at measurement of the frequency characteristic, the FFT analyzer 60 generates the disturbance having the predetermined frequency and the AD converter 61 converts the analog disturbance signal to a digital signal at double the sampling frequency, namely at the frequency 2·$f_1$.

When the servo interrupt SIT1 is generated by reading of the servo mark of the first servo area SV1 at the beginning of the sector, the digital servo controller 57 detects and outputs the position signal x, calculates the control current and outputs the same, thereby driving the actuator and entering the position signal x into the FFT analyzer 60. The actuator controls the head position by rotating the voice coil motor VCM using the commanded current value, and the FFT analyzer 60 accepts the position signal x and the control current i, which is the output of the power amplifier 59, and executes processing for measuring the frequency characteristic.

When the servo interrupt SIT2 is generated by reading of the servo mark of the second servo area SV2 in the middle of the sector, the digital servo controller 57 only detects and outputs the position signal x; it does not calculate and output the control current. The FFT analyzer 60 executes processing for measuring frequency based upon the detected position signal x and the control current i. When measurement of the frequency characteristic of the predetermined disturbance frequency is concluded through the operation described above, the disturbance frequency is subsequently changed over and the frequency characteristic is measured successively over all frequencies.

By virtue of the foregoing operation, position control at time of data read/write is performed at the sampling frequency $f_1$ (=5.4 kHz) and frequency measurement is performed at a rate which is twice the sampling frequency at data read/write, namely 10.8 kHz. As a result, the Nyquist frequency becomes 5.4 kHz, which is double that at the time of data read/write, and a frequency characteristic up to 5.4 kHz can be measured accurately. Accordingly, it is possible to accurately measure the frequency characteristic (mechanical resonance frequency and resonance level, etc.) in the vicinity of the mechanical resonance point below 5.4 kHz.

(E) Processing by digital servo controller

Figure 5:
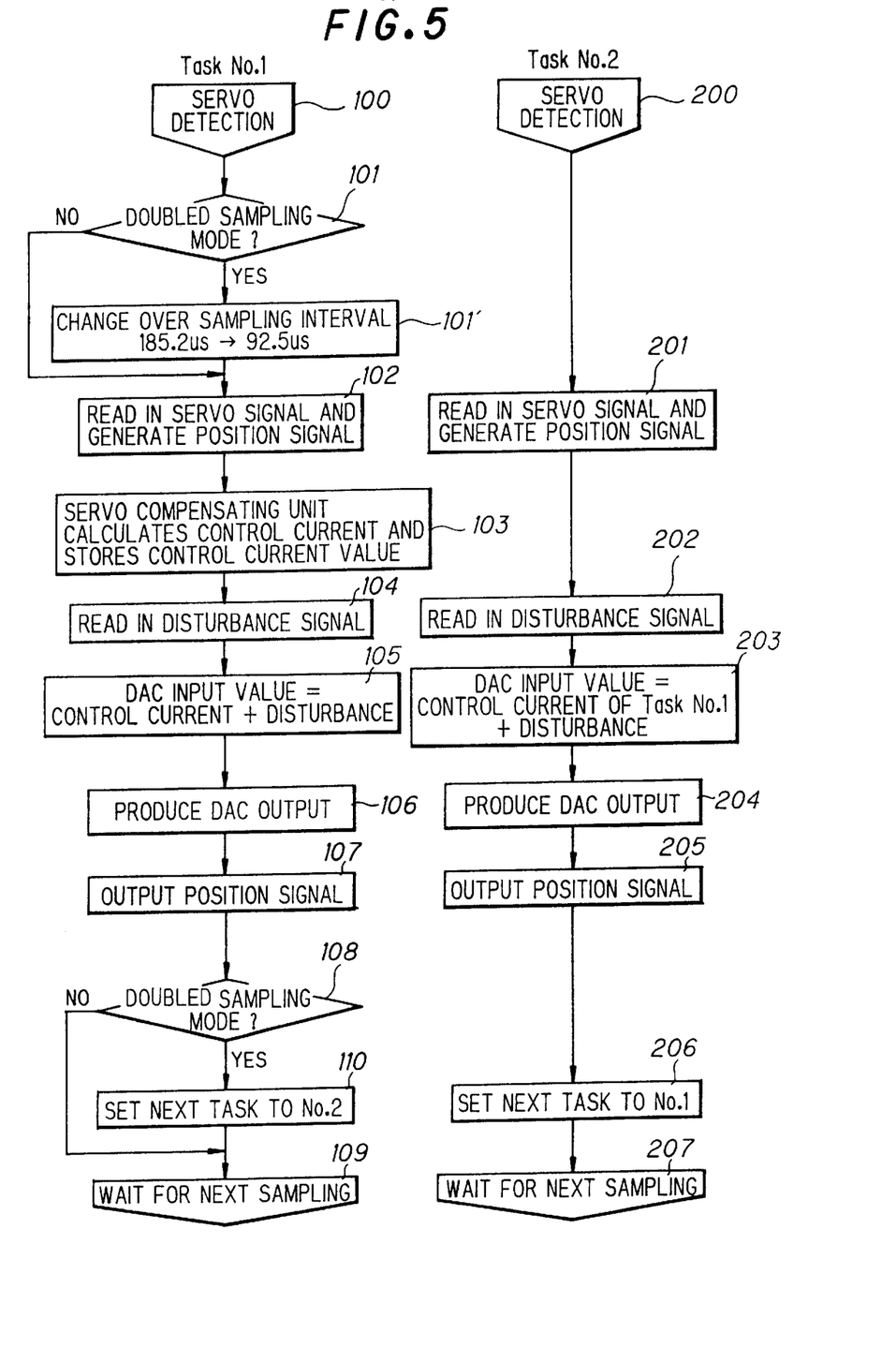
FIG. 5 is a flowchart of processing executed at the time of doubled sampling.

FIG. 5 is a flowchart of processing executed by the digital servo controller 57, namely position control processing when the head is on track and processing for measuring frequency characteristic.

(a) Ordinary sampling mode

When the first servo interrupt SIT1 is generated in the ordinary sampling mode, i.e., at data read/write (step 100), the position signal detector 57a of the digital servo controller 57 reads the servo signal outputted by the AD converter 56 and generates the position signal (steps 101, 102). Next, the servo compensating unit 57b calculates the control current based upon the position signal and stores this signal (step 103). The synthesizer 57c reads the disturbance signal u (u=0), adds the disturbance signal to the control current and enters the resulting signal into the DA converter 58 (step 105). The latter outputs the analog control current command value and the position signal output unit 57d outputs the position signal x (steps 106, 107). The system then waits for generation of the next servo interrupt signal SIT1 (steps 108, 109) and repeats position control from step 101 onward in response to generation of the interrupt signal SIT1.

(b) Frequency measurement mode (doubled sampling mode)

When the first servo interrupt SIT1 is generated in the mode for measuring the frequency characteristic (step 100), the sampling-time changeover unit 57e changes over the sampling period from 185.2 μs prevailing at data read/write to 92.5 μs (steps 101, 101') in response to a sampling-period changeover command from the host. Further, the position signal detector 57a of the digital servo controller 57 reads the servo signal outputted by the AD converter 56 and generates the position signal (step 102). Next, the servo compensating unit 57b calculates the control current based upon the position signal and stores this signal (step 103). The synthesizer 57c reads the disturbance signal u (u≠0), adds the disturbance signal to the control current and enters the resulting signal into the DA converter 58 (step 105). At measurement of frequency, the FFT analyzer 60 generates the disturbance signal of the predetermined frequency and the AD converter 61 converts the disturbance signal to a digital signal at twice the sampling frequency and outputs this digital signal.

The DA converter 58 converts the sum of the control current and disturbance signal to an analog signal and outputs the analog signal as a control current command value (step 106). The position signal output unit 57d outputs the position signal x (step 107). The FFT analyzer 60 reads the position signal x and the control current i, which is the output of the power amplifier 59, at double the sampling period (i.e., at 92.5 μs) and analyzes the frequency characteristic. A Task No. 2 is set so as to start up in response to the next servo interrupt signal SIT2 (step 110) and the system waits for generation of the next servo interrupt signal SIT2 (step 109). The steps 100 through 109 construct a Task No. 1.

When the servo interrupt signal SIT2 is generated under these conditions (step 200), the position signal detector 57a of the digital servo controller 57 reads the servo signal outputted by the AD converter 56 and generates the position signal x (step 201). Next, the synthesizer 57c reads the disturbance signal u (step 202), adds this signal to the stored control current value and enters the result into the DA converter 58 (step 203).

The DA converter 58 converts the sum of the control current and disturbance signal to an analog signal and outputs the analog signal as the control current command value (step 204). The position signal output unit 57d outputs the position signal x (step 205). The FFT analyzer 60 reads the position signal x and the control current i, which is the output of the power amplifier 59, at double the sampling period (i.e., at 92.5 μs) and analyzes the frequency characteristic. The Task No. 1 is set so as to start up in response to the next servo interrupt signal SIT1 (step 206) and the system waits for generation of the next servo interrupt signal SIT1 (step 207). The steps 200 through 207 construct the Task No. 2.

When measurement of the frequency characteristic of the predetermined frequency ends with regard to the disturbance signal, the FFT analyzer 60 then changes over the disturbance frequency and measures the frequency characteristic of a desired band through the processing described above.

(F) Modification

Figure 6:
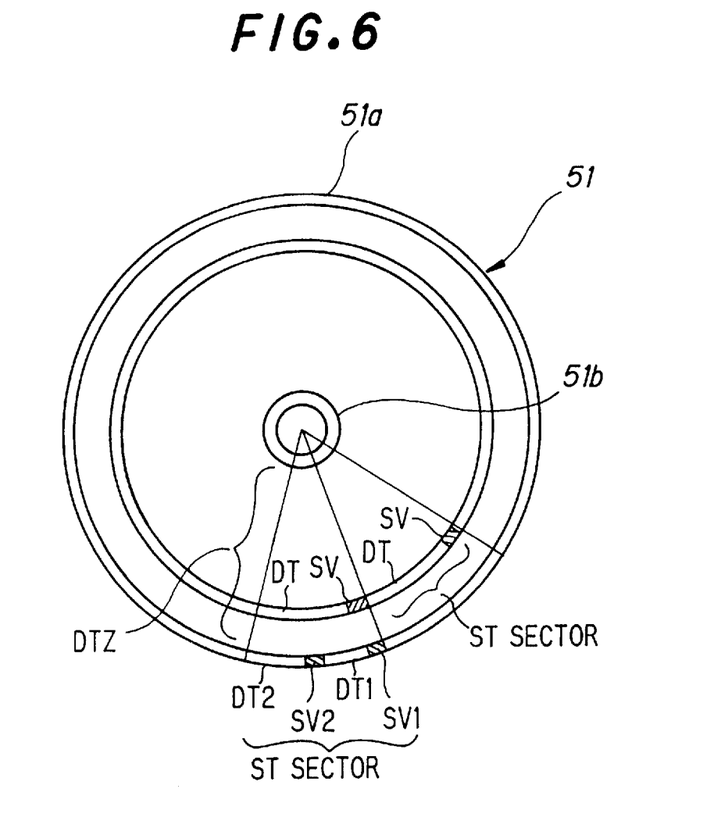
FIG. 6 is a diagram for describing a modification of the method of recording servo information.

The foregoing is for a case where servo information is recorded on all tracks at a sampling period which is 1/N (e.g., N=2) of the position control priod prevailing at the time of data read/write. With this method, however, the data area is narrowed and the quantity of data that can be stored is reduced. Accordingly, as shown in FIG. 6, an arrangement is adopted in which the servo areas SV1, SV2 are provided in each sector ST of an outermost track 51a or an innermost track 51b, namely outside the data zone of the DTZ of the magnetic disk 51, the servo information is written at the sampling period $T_2$ (=92.5 μs) which is 1/N (e.g., N=2) of the position control period $T_1$ (=185 μs) at the time of data read/write, and servo information SV is written only in one servo area SVA in each sector of each track of data zone DTZ at period $T_1$ (=185 μ). In a case where use is made of a magnetic disk on which servo information has been recorded by this servo information recording method, the head is moved to the outermost track only when the frequency characteristic is measured, and then the frequency characteristic is measured by the above-described method. In FIG. 6, DT, DT1 and DT2 are data areas.

The present invention has been described in a case where the invention is applied to a data-surface servo system. However, the invention is applicable also to a servo-surface servo system in which servo information has been recorded on a servo disk.

Though a case has been described in which the present invention is applied to a magnetic disk apparatus, the invention is applicable to other disk apparatuses as well.

In accordance with the present invention, it is so arranged that servo information is written on the disk at a sampling interval which is 1/N of the period $T_1$ at which the position of the head is controlled, namely at a sampling frequency multiplied by the factor N. Therefore, if N=2 holds, for example, the Nyquist frequency becomes 5.7 kHz and a frequency characteristic (mechanical resonance frequency, resonance level, etc.) up to this Nyquist frequency of 5.7 kHz can be measured accurately. This makes it possible to accurately measure the frequency characteristic in the vicinity of the resonance point. This is not possible in the prior art. Shifting of the resonance-point frequency and adjustment of the resonance-point level can be performed easily and accurately.

Further, the servo information is recorded on an outermost track or innermost track, which is outside the data zone, at the sampling frequency multiplied by N. Accordingly, it can be so arranged that the amount of data stored on the disk will not be reduced regardless of the fact that the Nyquist frequency can be raised.

Furthermore, in accordance with the invention, it will suffice if the servo controller calculates the position signal and current command value using the servo information at the first sampling point from among the N items of servo information in the position control period when ordinary position control is carried out. As a result, the servo controller is capable of performing position control with sufficient margin. Moreover, when the frequency characteristic of the servo loop is measured, it will suffice for the servo controller merely to calculate the position signal using the servo information at the second through Nth sampling points (calculating the current command value is unnecessary). As a result, processing for measuring the frequency characteristic can be executed with sufficient margin.

As many apparently widely different embodiments of the present invention can be made without departing from the spirit and scope thereof, it is to be understood that the invention is not limited to the specific embodiments thereof except as defined in the appended claims.

What is claimed is:

1. A disk apparatus, which has a disk provided with a servo area and a data area, for moving a head to a target position or for positioning the head at the target position by controlling an actuator using servo information that has been recorded in the servo area, wherein servo information recorded on said disk comprises first servo information recorded in the servo area and used in controlling position of the head and second servo information used to measure the frequency characteristic of a servo loop in the disk apparatus.

2. The apparatus according to claim 1, wherein (N−1) items of the second servo information (where N is an integer of two or greater) are recorded at equal intervals between positions at which the first servo information have been recorded on a track.

3. The apparatus according to claim 2, further comprising a servo controller, wherein said servo controller including:
   means for generating a position signal, which indicates deviation of the head from center of a track, using the first servo information;
   means for executing processing for controlling the actuator by calculating a current command value, which drives said actuator, on the basis of the position signal; and
   means for position-signal generation processing for measuring the frequency characteristic of a servo loop in said disk apparatus using the (N−1) items of the second servo information.

4. The apparatus according to claim 1, wherein the second servo information has been written on a track other than in a data zone of the disk at a sampling period which is 1/N (where N is an integer of two or greater) of a sampling period of the first servo information, said first information being recorded in the servo area of said data zone.

5. A method of measuring a frequency characteristic of a servo loop in a disk apparatus for moving a head to target position or positioning the head at the target position by controlling an actuator using servo information that has been recorded in a servo area of a disk having the servo area and a data area, comprising the steps of:
   connecting a frequency characteristic analyzer, which is for measuring the frequency characteristic of the servo loop, to said disk apparatus;
   writing the servo information on a track so as to be sampled at a period which is 1/N (where N is an integer of two or greater) of the period at which the position of the head is controlled;
   in a servo controller of the disk apparatus, generating a position signal, which indicates deviation of the head from center of a track, using servo information at a first sampling point from among N items of servo information within the period at which the position of the head is controlled, calculating an actuator drive current command value, which drives the actuator, on the basis of the position signal, controlling said actuator based upon said actuator drive current command value, and executing position-signal generation processing for measuring the frequency characteristic of the servo loop using the servo information at second through Nth sampling points;
   inserting a disturbance signal having a predetermined frequency into the servo loop from said frequency characteristic analyzer when the frequency characteristic of the servo loop is measured; and
   in said frequency characteristic analyzer, accepting, at the sampling period which is 1/N of the period at which the position of the head is controlled, the position signal generated based upon each item of servo information and the actuator drive current, and obtaining the frequency characteristic of the servo loop using the accepted position signal and the actuator drive current.

6. The method according to claim 5, further comprising the steps of:
   writing servo information on a track other than in a data zone of the disk at a sampling period which is 1/N of a sampling period of servo information in said data zone; and
   positioning the head in an area other than said data zone when the frequency characteristic is measured.

7. A method of measuring a frequency characteristic of a servo loop in a disk apparatus comprising the steps of:
   writing servo information to a disk;
   generating a first position signal using servo information at a first sampling point from among N (where N is an integer of two or greater) items of servo information arranged on a track of the disk;
   calculating an actuator drive current command value on the basis of the first position signal;
   generating a second position signal for measuring the frequency characteristic of a servo loop using the servo information at second through Nth sampling points from among said N items of servo information;
   inputting to the servo loop a disturbance signal having a predetermined frequency; and
   obtaining the frequency characteristic of the servo loop using the first position signal and the second position signal.

8. A disk apparatus having a disk in which servo information is recorded and including a system for controlling an actuator using the servo information comprising:
   detecting means for detecting servo information arranged on a track of the disk;
   first signal generating means for generating a first position signal in accordance with servo information sampled at a first sampling point from among N (where N is an integer of two or greater) items of servo information arranged in a track of the disk;
   second signal generating means for generating a second position signal in accordance with servo information sampled at second through Nth sampling points from among said N items of servo information; and
   calculating means for calculating an actuator drive current command value on the basis of the first position signal.

* * * * *